(12) United States Patent
Jung et al.

(10) Patent No.: US 10,313,616 B2
(45) Date of Patent: Jun. 4, 2019

(54) IMAGE SENSORS INCLUDING SHIELDING STRUCTURES

(71) Applicant: Samsung Electronics Co., Ltd., Suwon-si, Gyeonggi-do (KR)

(72) Inventors: Yunhwan Jung, Hwaseong-si (KR); Sunyool Kang, Iksan-si (KR); Kyoungmin Koh, Hwaseong-si (KR); Seungjin Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 121 days.

(21) Appl. No.: 15/434,605

(22) Filed: Feb. 16, 2017

(65) Prior Publication Data

US 2017/0257582 A1 Sep. 7, 2017

(30) Foreign Application Priority Data

Mar. 3, 2016 (KR) .......................... 10-2016-0025819

(51) Int. Cl.
*H04N 5/335* (2011.01)
*H04N 5/357* (2011.01)
*H04N 5/374* (2011.01)
*H04N 5/378* (2011.01)
*H04N 9/04* (2006.01)

(52) U.S. Cl.
CPC .......... *H04N 5/3577* (2013.01); *H04N 5/374* (2013.01); *H04N 5/378* (2013.01); *H04N 9/045* (2013.01)

(58) Field of Classification Search
CPC .................................................... H04N 5/3577
USPC ........................................................... 348/308
See application file for complete search history.

(56) References Cited

U.S. PATENT DOCUMENTS

| | | |
|---|---|---|
| 6,278,169 B1 | 8/2001 | Sayuk et al. |
| 6,838,651 B1 | 1/2005 | Mann |
| 6,924,840 B1 | 8/2005 | Furuhata |
| 7,598,478 B2 | 10/2009 | Morimoto et al. |
| 8,957,996 B2 | 2/2015 | Kajihara et al. |
| 9,081,141 B2 | 7/2015 | Tsukamoto et al. |
| 2008/0303920 A1* | 12/2008 | Kinoshita ............ H04N 5/2353 348/226.1 |
| 2009/0201406 A1* | 8/2009 | Okita ................ H01L 27/14609 348/308 |
| 2015/0001512 A1 | 1/2015 | Huang et al. |
| 2015/0130977 A1 | 5/2015 | Ladd |
| 2015/0163464 A1 | 6/2015 | Egawa et al. |

(Continued)

*Primary Examiner* — Usman A Khan
(74) *Attorney, Agent, or Firm* — Sughrue Mion, PLLC

(57) ABSTRACT

An image sensor includes first pixels and second pixels arranged in alternating order along a first direction, first output lines extending in a second direction that is perpendicular to the first direction and respectively connected to the first pixels, second output lines extending in the second direction and respectively connected to the second pixels, first analog circuit blocks and second analog circuit blocks arranged in alternating order along the first direction, and shielding structures disposed each between adjacent ones of the first and second analog circuit blocks. Each of the first analog circuit blocks includes a plurality of first analog circuits respectively connected to the first output lines. Each of the second analog circuit blocks includes a plurality of second analog circuits respectively connected to the second output lines.

20 Claims, 16 Drawing Sheets

(56) References Cited

U.S. PATENT DOCUMENTS

2015/0181143 A1 6/2015 Yoo
2015/0341579 A1 11/2015 Kobayashi et al.

* cited by examiner

IMAGE SENSORS INCLUDING SHIELDING STRUCTURES

CROSS-REFERENCE TO RELATED APPLICATIONS

This U.S. nonprovisional patent application claims priority under 35 U.S.C. § 119 to Korean Patent Application 10-2016-0025819 filed on Mar. 3, 2016, the entire contents of which are hereby incorporated by reference.

BACKGROUND

The present disclosure relates to image sensors and, more particularly, to image sensors including analog circuits having improved performance and increased integration.

An image sensor is a microelectronic device that converts optical signals into electrical signals. Recent advances in the computer and communication industries have led to strong demand for high performance image sensors for use in a variety of applications, such as digital cameras, camcorders, PCSs (Personal Communication Systems), game devices, security cameras, medical micro cameras, etc. Accordingly, it there is an increasing need to enhance the performance of electronic imaging devices and image sensors included therein.

SUMMARY

Embodiments of the present inventive concepts provide an image sensor having improved performance of analog circuits and increased integration.

According to exemplary embodiments of the present inventive concepts, an image sensor may include first pixels and second pixels alternately arranged along a first direction; first output lines extending in a second direction perpendicular to the first direction and respectively connected to each of the first pixels; second output lines extending in the second direction and respectively connected to each of the second pixels, each of the second output lines being disposed between adjacent ones of the first output lines; first analog circuit blocks and second analog circuit blocks alternately arranged along the first direction; and shielding structures disposed each between adjacent ones of the first and second analog circuit blocks. Each of the first analog circuit blocks may include a plurality of first analog circuits respectively connected to the first output lines. Each of the second analog circuit blocks may include a plurality of second analog circuits respectively connected to the second output lines.

According to exemplary embodiments of the present inventive concepts, an image sensor may include an active pixel sensor array including unit pixels arranged in a matrix manner and first and second output lines connected to the unit pixels, the first and second output lines being alternately arranged along one direction; and an analog-to-digital converter that converts pixel signals to digital signals, the pixel signals being output from the first and second output lines of the active pixel sensor array. The analog-to-digital converter may include: a plurality of shielding structures disposed spaced apart from each other along the one direction; a plurality of first analog circuits disposed between adjacent ones of the shielding structures and respectively connected to the first output lines; and a plurality of second analog circuits disposed between adjacent ones of the shielding structures and respectively connected to the second output lines.

An image sensor according to further embodiments of the inventive concepts includes first pixels configured to detect light having a first color, second pixels configured to detect light having a second color, first correlated double sampler (CDS) circuit blocks coupled to the first pixels and second CDS circuit blocks coupled to the second pixels, wherein each of the first CDS circuit blocks includes a plurality of first analog circuits respectively connected to the first pixels and each of the second CDS circuit blocks includes a plurality of second analog circuits respectively connected to the second pixels, and a shielding structure between the first and second analog circuit blocks.

DETAILED DESCRIPTION OF EMBODIMENTS

Figure 1:
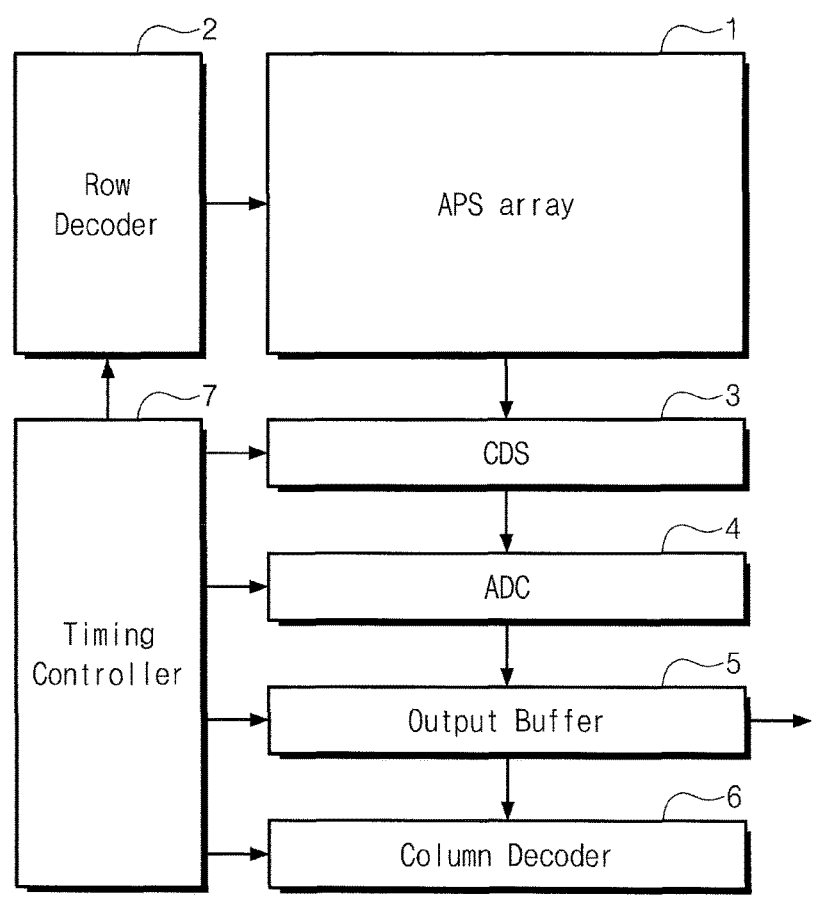
FIG. 1 is a block diagram illustrating a complementary metal oxide semiconductor image sensor according to exemplary embodiments of the present inventive concept.

Hereinafter, an image sensor according to exemplary embodiments of the present inventive concepts will be described in conjunction with the accompanying drawings FIG. 1 is a block diagram illustrating an image sensor according to exemplary embodiments of the present inventive concepts.

Referring to FIG. 1, an image sensor may include an active pixel sensor (APS) array 1, a row decoder 2, a correlated double sampler (CDS) 3, an analog-to-digital converter (ADC) 4, an output buffer 5, a column decoder 6, and a timing controller 7.

The active pixel sensor array 1 may include a plurality of unit pixels arranged in a matrix manner along rows and columns, each of which is configured to convert incident light into electrical signals. The active pixel sensor array 1 may be driven by a plurality of driving signals such as a pixel selection signal, a reset signal, and a charge transfer signal that are provided from the row decoder 2.

The row decoder 2 may provide several driving signals to respective rows of the unit pixels. The electrical signal converted at the active pixel sensor array 1 in response to the driving signals may be transmitted to the correlated double sampler 3.

The correlated double sampler 3 may receive the electrical signal generated in the active pixel sensor array 1, and hold and sample the received electrical signals. The correlated double sampler 3 may doubly sample a specific noise level and a signal level of the electrical signal, and then output a difference level corresponding to a difference between the noise and signal levels.

The analog-to-digital converter 4 may convert analog signals corresponding to the difference level received from the correlated double sampler 3 into digital signals, and then output the converted digital signals.

The output buffer 5 may latch the digital signals and then sequentially output the latched digital signals to an image signal processing unit (not shown) in response to the decoded result obtained from the column decoder 6.

The timing controller 7 may control the row and column decoders 2 and 6, the correlated double sampler 3, the analog-to-digital converter 4, and the output buffer 5. The timing controller 7 may also provide the row and column decoders 2 and 6, the correlated double sampler 3, the analog-to-digital converter 4, and the output buffer 5 with control signals such as a clock signal, a timing control signal, etc. The timing controller 7 may include a logic control circuit, a phase locked loop (PLL) circuit, a timing control circuit, and/or a communication interface circuit.

Figure 2:
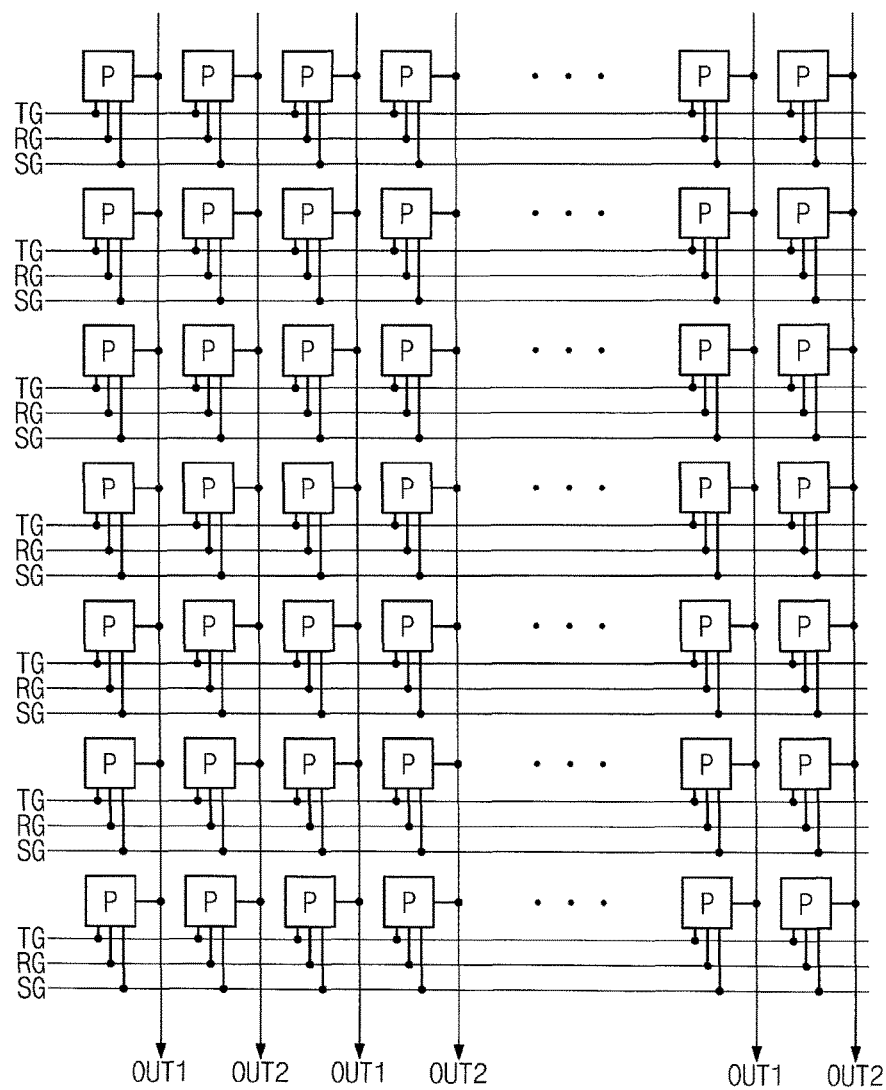
FIG. 2 is a block diagram illustrating an active pixel sensor array of an image sensor according to exemplary embodiments of the present inventive concept.

FIG. 2 is a block diagram illustrating an active pixel sensor array of an image sensor according to exemplary embodiments of the present inventive concepts.

Referring to FIG. 2, the active pixel sensor array 1 may include a plurality of unit pixels P that are arranged two-dimensionally along rows and columns. It will be appreciated that the unit pixels P can be arranged in other arrangements besides rows and columns. Incident light may be converted into an electrical signal at each of the unit pixels P, and the unit pixels P may be controlled by driving signals transmitted from a charge transfer line TG, a reset line RG, and/or a pixel selection line SG that are connected to the unit pixels P. The electrical signals converted at the unit pixels P may be provided to the correlated double sampler 3 of FIG. 1 through a plurality of output lines OUT1 and OUT2.

Figure 3A:
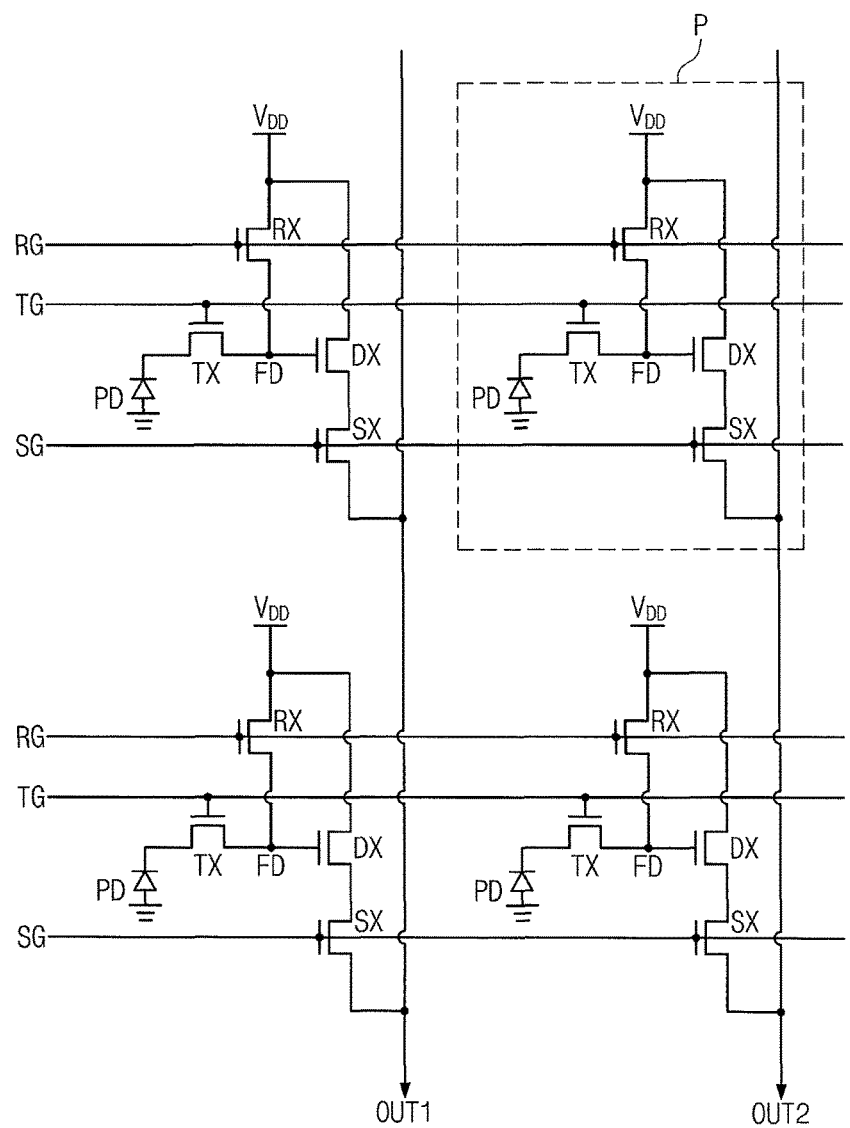
FIGS. 3A and 3B respectively show a circuit diagram of an active pixel sensor array of an image sensor according to exemplary embodiments of the present inventive concept.
Figure 3B:
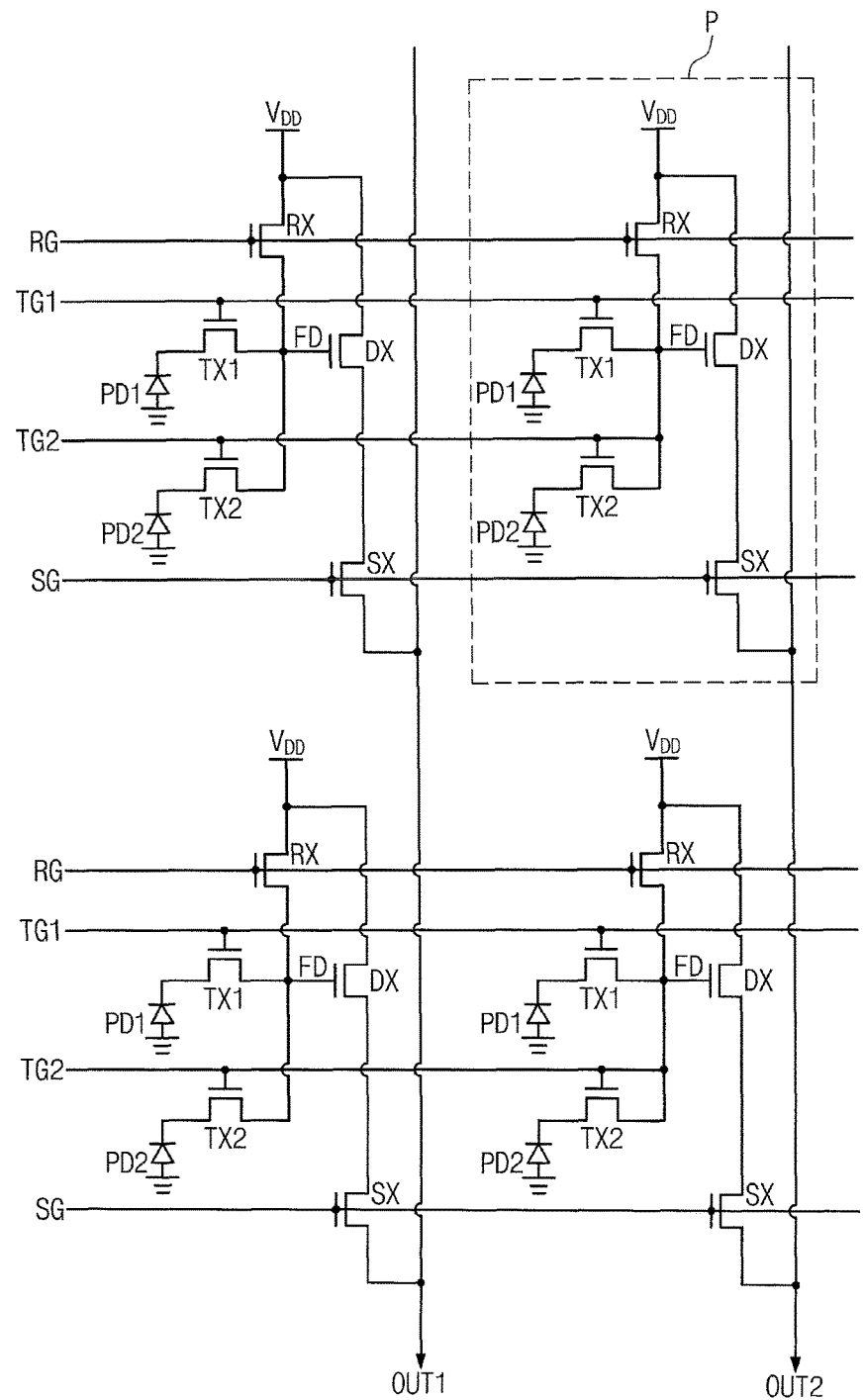

FIGS. 3A and 3B respectively show a circuit diagram of an active pixel sensor array of an image sensor according to exemplary embodiments of the present inventive concepts.

Referring to FIG. 3A, each of the unit pixels P may include a photoelectric conversion device PD, a transfer transistor TX, and logic transistors RX, SX and DX. The logic transistors RX, SX and DX may include a reset transistor RX, a selection transistor SX, and a drive transistor or source follower transistor DX. The transfer transistor TX, the reset transistor RX, and the selection transistor SX may include gate electrodes that are respectively connected to corresponding one of driving signal lines TG, RG and SG. The driving signal lines TG, RG and SG may extend in a row (horizontal) direction so as to simultaneously drive the unit pixels P included in the same row. The driving signal lines TG, RG and SG may include a charge transfer line TG, a reset line RG, and a pixel selection line SG.

In some embodiments, a single unit pixel P may include a single photoelectric conversion device PD and four MOS transistors TX, RX, DX and SX. Alternatively, the unit pixel P may include three MOS transistors or five MOS transistors, depending on the design of the unit pixel circuit.

More specifically, the photoelectric conversion device PD may generate and store charges corresponding to incident light. The photoelectric conversion device PD may be one of a photo diode, a photo transistor, a photo gate, a pinned photo diode (PPD), or any combination thereof.

The transfer transistor TX may transfer the charges accumulated in the photoelectric conversion device PD to a charge detection node FD, i.e., a floating diffusion region. The charge transfer line TG may be used as a transfer gate electrode, and the transfer transistor TX may be controlled by a charge transfer signal applied to the charge transfer line TG.

The charge detection node FD may receive and cumulatively store the charges generated at the photoelectric conversion device PD. The drive transistor DX may be controlled by an amount of photoelectric charges accumulated in the charge detection node FD.

The reset transistor RX may periodically reset the charges accumulated in the charge detection node FD. In detail, the reset transistor RX may include a drain electrode connected to the charge detection node FD and a source electrode connected to a power supply voltage VDD. The reset line RG may be used as a reset gate electrode, and the power supply voltage VDD connected to the source electrode of the reset transistor RX may be transmitted to the charge detection node FD when the reset transistor RX is turned on by the reset signal. Accordingly, when the reset transistor RX is turned on, the charges accumulated in the charge detection node FD may be exhausted and thus the charge detection node FD may be reset.

The drive transistor DX may, together with a constant current source located outside the active pixel sensor array 1, serve as a source follower buffer amplifier. The drive transistor DX may amplify a variation in electrical potential of the charge detection node FD and output the amplified electrical potential.

The selection transistor SX may select each row of the unit pixels P to be read. The pixel selection line SG may be used as a selection gate electrode of the selection transistor SX. When the selection transistor SX are turned on by the pixel selection signal applied to the pixel selection line SG, the output signals of the drive transistor DX may be transmitted to the output lines OUT1 and OUT2.

Referring to FIG. 3B, each of the unit pixels P may include first and second photoelectric devices PD1 and PD2, first and second transfer transistors TX1 and TX2, and logic transistors RX, SX and DX. The first and second transfer transistors TX1 and TX2, the reset transistor RX, and the selection transistors SX may include gate electrodes that are respectively connected corresponding one of driving signal lines TG1, TG2, RG and SG. The driving signal lines TG1, TG2, RG and SG may extend in a row (horizontal) direction so as to simultaneously drive multiple unit pixels P arranged in the same row. The driving signal lines TG1, TG2, RG and SG may include a first charge transfer line TG1, a second charge transfer line TG2, a reset line RG, and a pixel selection line SG.

The first charge transfer line TG1 may be used as a transfer gate electrode of the first transfer transistor TX1, and the first transfer transistor TX1 may be controlled by a charge transfer signal applied to the first charge transfer line TG1. The second charge transfer line TG2 may be used as a transfer gate electrode of the second transfer transistor TX2, and the second transfer transistor TX2 may be controlled by a charge transfer signal applied to the second charge transfer line TG2.

The first transfer transistor TX1 may be connected to the first transfer gate electrode TG1 and the first photoelectric conversion device PD1. The second transfer transistor TX2 may be connected to the second transfer gate electrode TG2 and the second photoelectric conversion device PD2. The first and second transfer transistors TX1 and TX2 may share a charge detection node FD, i.e., a floating diffusion region.

The first and second photoelectric conversion devices PD1 and PD2 may generate and accumulate photo charges in proportion to an amount of externally incident light. The first and second photoelectric conversion devices PD1 and PD2 may include one of a photo diode, a photo transistor, a photo gate, a pinned photo diode (PPD), or any combination thereof.

The first and second transfer gate electrodes TG1 and TG2 may transfer the charges accumulated in the first and second photoelectric conversion devices PD1 and PD2 to the charge detection node FD, i.e., the floating diffusion region. Complementary signals may be applied to the first and second transfer gates TG1 and TG2. In other words, the charges may be transferred to the charge detection node FD from one of the first and second photoelectric conversion devices PD1 and PD2.

The charge detection node FD may receive and cumulatively store the charges generated in the first and second photoelectric conversion devices PD1 and PD2. The drive transistor DX may be controlled by an amount of photo charges accumulated in the charge detection node FD.

The reset transistor RX may be connected to the charge detection node FD and periodically reset the charges accumulated in the charge detection node PD. The drive transistor DX may serve as a source follower amplifier, and amplify a variation in electrical potential of the charge detection node FD and output the amplified electrical potential. the amplified electrical potential may be transmitted to output lines OUT1 and OUT2, when the selection transistor SX is turned on.

Figure 4:
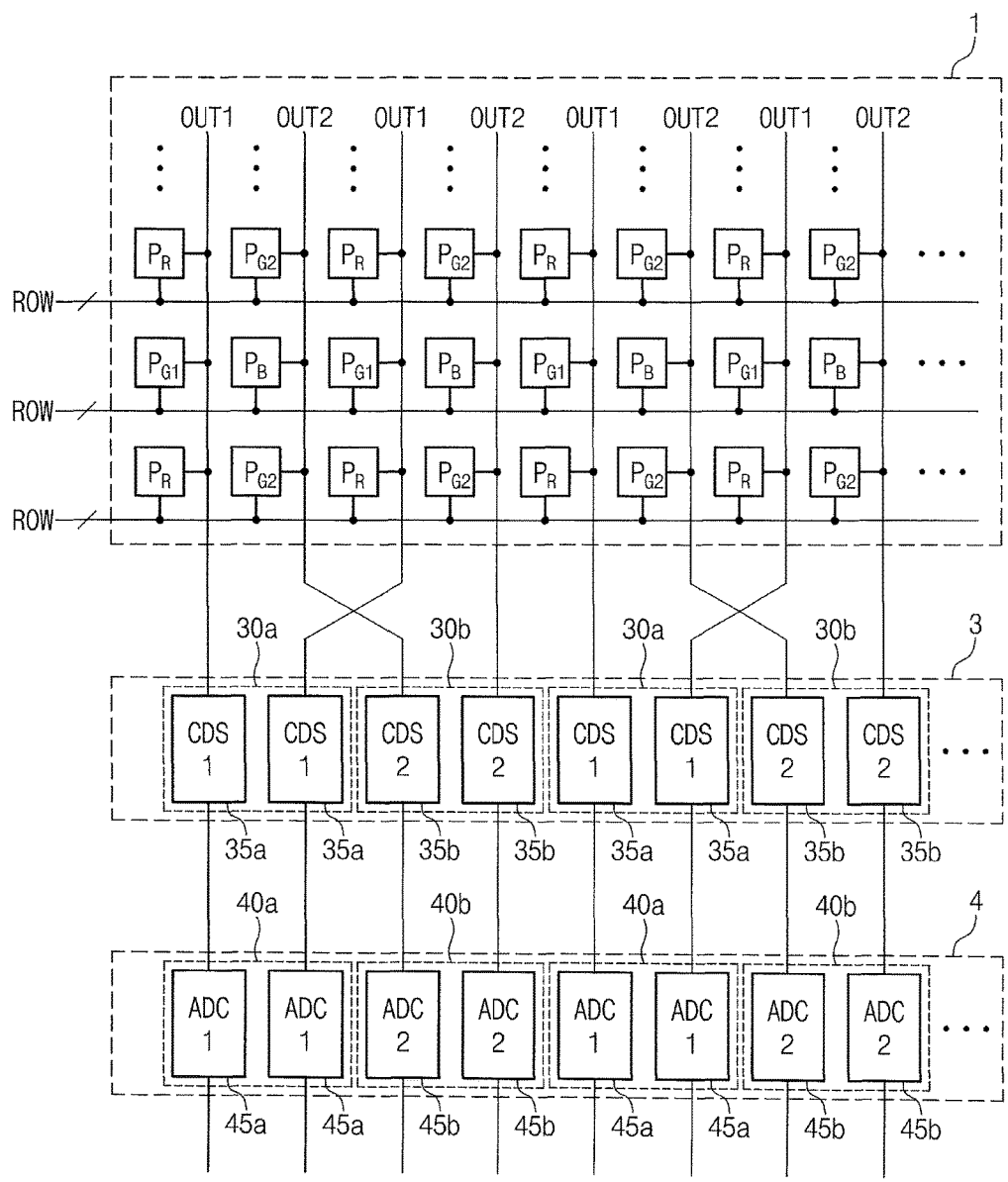
FIG. 4 is a circuit diagram illustrating an image sensor according to exemplary embodiments of the present inventive concept.

FIG. 4 is a circuit diagram roughly illustrating an image sensor according to exemplary embodiments of the present inventive concepts.

Referring to FIG. 4, the active pixel array 1 may include a plurality of unit pixels $P_R$, $P_B$, $P_{G1}$ and $P_{G2}$ as discussed with reference to FIGS. 2, 3A and 3B. The plurality of unit pixels $P_R$, $P_B$, $P_{G1}$ and $P_{G2}$ may be arranged in a matrix manner along rows and columns. The active pixel sensor array 1 may include color filters respectively corresponding to the unit pixels $P_R$, $P_B$, $P_{G1}$ and $P_{G2}$. In some embodiments, each of the unit pixels $P_R$, $P_B$, $P_{G1}$ and $P_{G2}$ may include one of red, green, and blue color filters. Alternatively, each of the unit pixels $P_R$, $P_B$, $P_{G1}$ and $P_{G2}$ may one of magenta, yellow, and cyan color filters. In addition, one of the unit pixels $P_R$, $P_B$, $P_{G1}$ and $P_{G2}$ may include a white filter or an infrared filter.

More specifically, the active pixel sensor array 1 may include first to third unit pixels $P_R$, $P_B$, and $P_{G1}$, and the first to third unit pixels $P_R$, $P_B$, and $P_{G1}$ may receive light with different wavelength ranges. Moreover, each pixel in the active pixel sensor array may include two green pixels, $P_{G1}$ and $P_{G2}$. For example, the first unit pixels $P_{G1}$ and $P_{G2}$ may receive light with a first wavelength band, and the second unit pixels $P_R$ may receive light with a second wavelength band greater than the first wavelength band. And, the third unit pixels $P_B$ may receive light with a third wavelength band less than the first wavelength band. For example, the first unit pixels $P_{G1}$ and $P_{G2}$ may include the green color filter and generate photoelectrons corresponding to green light passing through the green color filter. The second pixels $P_R$ may include the red color filter and generate photoelectrons corresponding to red light passing through the red color filter. The third pixels $P_B$ may include the blue color filter and generate photoelectrons corresponding to blue light passing through the blue color filter.

In some embodiments, in the active pixel sensor array 1, the first unit pixels $P_{G1}$ and $P_{G2}$ may be arranged in a Bayer pattern, in which the number of the first unit pixels $P_{G1}$ and $P_{G2}$ is twice the number of the second unit pixels $P_R$ or the third unit pixel $P_B$. Specifically, the first unit pixels $P_{G1}$ and $P_{G2}$ may be arranged spaced apart from each other along row and column directions. Each of the second unit pixels $P_R$ may be disposed between the first unit pixels $P_{G1}$ and $P_{G2}$ adjacent to each other in the row direction and between the first unit pixels $P_{G1}$ and $P_{G2}$ adjacent to each other in the column direction. Each of the third unit pixels $P_B$ may be disposed between the first unit pixels $P_{G1}$ and $P_{G2}$ adjacent to each other in the row direction and between the first unit pixels $P_{G1}$ and $P_{G2}$ adjacent to each other in the column direction, and may be positioned by the second unit pixels $P_R$ in a diagonal direction. In other words, the first unit pixels $P_{G1}$ and $P_{G2}$ and the second unit pixels $P_R$ may be alternately arranged in each row or the first unit pixels $P_{G1}$ and $P_{G2}$ and the third unit pixels $P_B$ may be alternately arranged in each row.

A plurality of driving lines ROW may extend along the row direction, and may be commonly connected to the unit pixels $P_R$, $P_B$, $P_{G1}$ and $P_{G2}$ arranged in each row. The driving lines ROW may include the charge transfer line TG, TG1 or TG2, the reset line RG, and the pixel selection line SG discussed with reference to FIG. 3A or 3B.

The output lines OUT1 and OUT2 may extend along the column direction, and may be commonly connected to the unit pixels $P_R$, $P_B$, $P_{G1}$ and $P_{G2}$ arrayed in each column. In some embodiment, the output lines OUT1 and OUT2 may include first output lines OUT1 and second output lines OUT2 that are alternately arranged along the row direction. Each of the first output lines OUT1 may be commonly connected to the first unit pixels $P_{G1}$ and the second unit pixels $P_R$ arranged along the column direction. Each of the second output lines OUT2 may be commonly connected to the first unit pixels $P_{G2}$ and the third unit pixels $P_B$ arranged along the column direction. In other words, when pixel signals are generated at the unit pixels $P_R$, $P_B$, $P_{G1}$ and $P_{G2}$ disposed in the same row, adjacent ones of the first and second output lines OUT1 and OUT2 may output the generated pixel signals corresponding to light with different colors. For example, the first output line OUT1 may output a first pixel signal generated by the green or red light, and the second output line OUT2 may output a second pixel signal, which is different from the first pixel signal, generated by the green or blue light.

The correlated double sampler 3 may be connected to the first and second output lines OUT1 and OUT2 of the active pixel sensor array 1. In some embodiments, the correlated double sampler 3 may include first and second correlated double sampler (CDS) circuit blocks 30a and 30b that are alternately disposed along the row direction. Each of the first CDS circuit blocks 30a may include a plurality of first CDS circuits 35a. Each of the second CDS circuit blocks 30b may include a plurality of second CDS circuits 35b. For example, each of the first CDS circuit blocks 30a may include two first CDS circuits 35a, and each of the second CDS circuit blocks 30b may include two second CDS circuits 35b.

In some embodiments, the first CDS circuits 35a may be connected to respective ones of the first output lines OUT1 of the active pixel sensor array 1, and the second CDS circuits 35b may be connected to respective ones of the second output lines OUT2 of the active pixel sensor array 1. That is, the number of the first CDS circuits 35a may be the same as that of the first output lines OUT1, and the number of the second CDS circuits 35b may be the same as that of the second output lines OUT2. In some embodiments, adjacent ones of the first and second output lines OUT1 and OUT2 may be cross provided to the correlated double sampler 3.

The analog-to-digital converter 4 may receive a correlated double sampled signal from the correlated double sampler 3. In some embodiments, the analog-to-digital converter 4 may include first analog-to-digital converter (ADC) circuit blocks 40a and second analog-to-digital converter (ADC) circuit blocks 40b that are alternately disposed along the row direction. Each of the first ADC circuit blocks 40a may include a plurality of first ADC circuits 45a, and each of the second ADC circuit blocks 40b may include a plurality of second ADC circuits 45b. The first ADC circuits 45a may convert signals sampled by the first CDS circuits 35a into digital signals, and the second ADC circuits 45b may convert signals sampled by the second CDS circuits 35b into digital signals.

Figure 5:
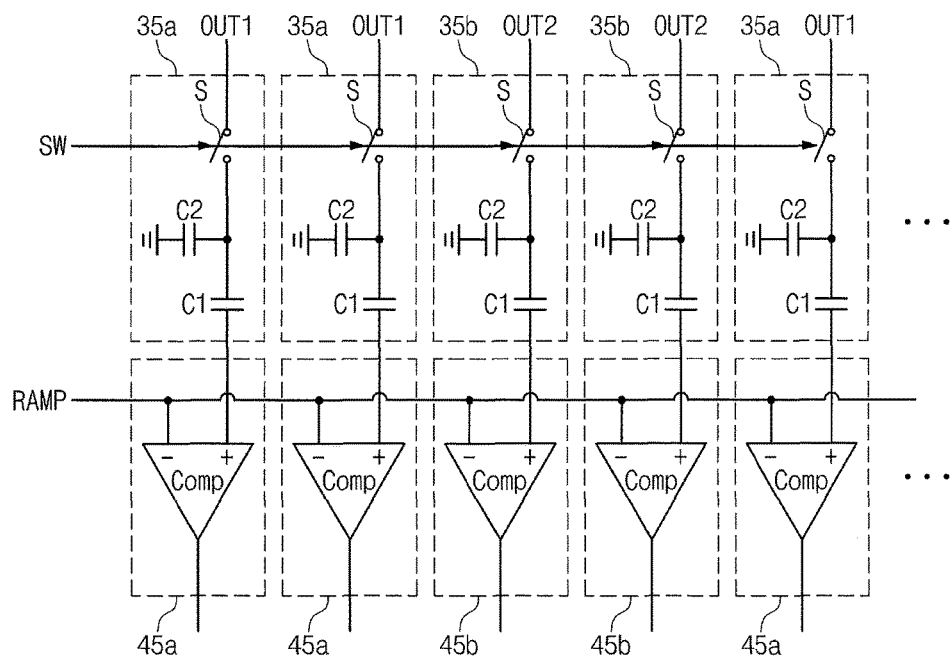
FIG. 5 is a circuit diagram illustrating a portion of an image sensor according to exemplary embodiments of the present inventive concept.

FIG. 5 is a circuit diagram illustrating a portion of an image sensor according to some embodiments of the present inventive concepts.

Referring to FIG. 5, the first and second CDS circuits 35a and 35b may perform a correlated double sampling operation on pixel signals which are output from the active pixel sensor array 1 of FIG. 4. Each of the first CDS circuits 35a may reduce a level of noise in pixel signals that are output through the first output lines OUT1, and each of the second CDS circuits 35b may reduce noise a level of noise in pixel signals that are output through the second output lines OUT2.

In some embodiments, each of the first and second CDS circuits 35a and 35b may include a switch S and first and second capacitors C1 and C2. The switch S may control operation of the first and second CDS circuits 35a and 35b in response to a control signal SW provided from the timing controller 7 of FIG. 1. The switch S may transmit a pixel signal that is output from the unit pixels to the first capacitor C1. For example, the switch S may include a MOS transistor.

The first capacitor C1 may be connected between the switch S and one of the first and second ADC circuits 45a and 45b. The second capacitor C2 may be electrically connected to the first capacitor C1 in parallel between the switch S and a ground voltage.

The first and second capacitors C1 and C2 may attenuate noise from pixel signals which are respectively output from the first and second output lines OUT1 and OUT2. The output signals filtered by the first and second capacitors C1 and C2 may be input to first input terminals of the first and second ADC circuits 45a and 45b.

Each of the first and second ADC circuits 45a and 45b may include a comparator, and the comparator may be connected to a ramp signal generator (not shown) and one of the first and second CDS circuits 35a and 35b.

The comparator may include a first input terminal configured to receive a CDS signal output from one of the first and second CDS circuits 35a and 35b, and a second input terminal configured to receive a ramp signal RAMP outputted from the ramp signal generator (not shown). The ramp signal RAMP may be a signal having a constant decreasing or increasing slope in response to the control signal provided from the timing controller 7 of FIG. 1. The comparator may compare the ramp signal with the CDS signal and then output a comparison signal. The comparison signal may correspond to a difference between the ramp signal and the pixel signal which is varied according to an amount of light.

Figure 6:
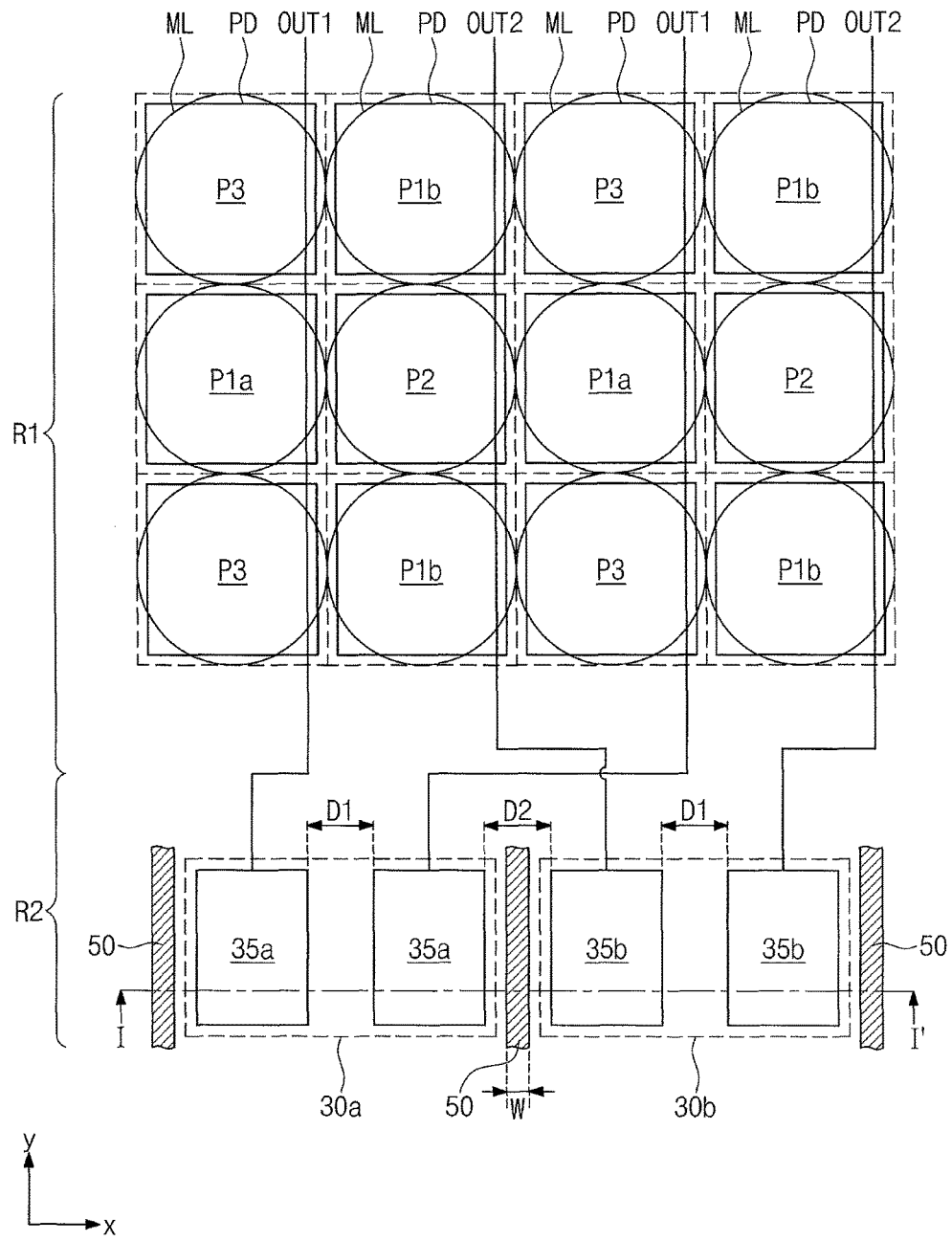
FIG. 6 is a plan view illustrating a portion of an image sensor according to exemplary embodiments of the present inventive concept.
Figure 7:
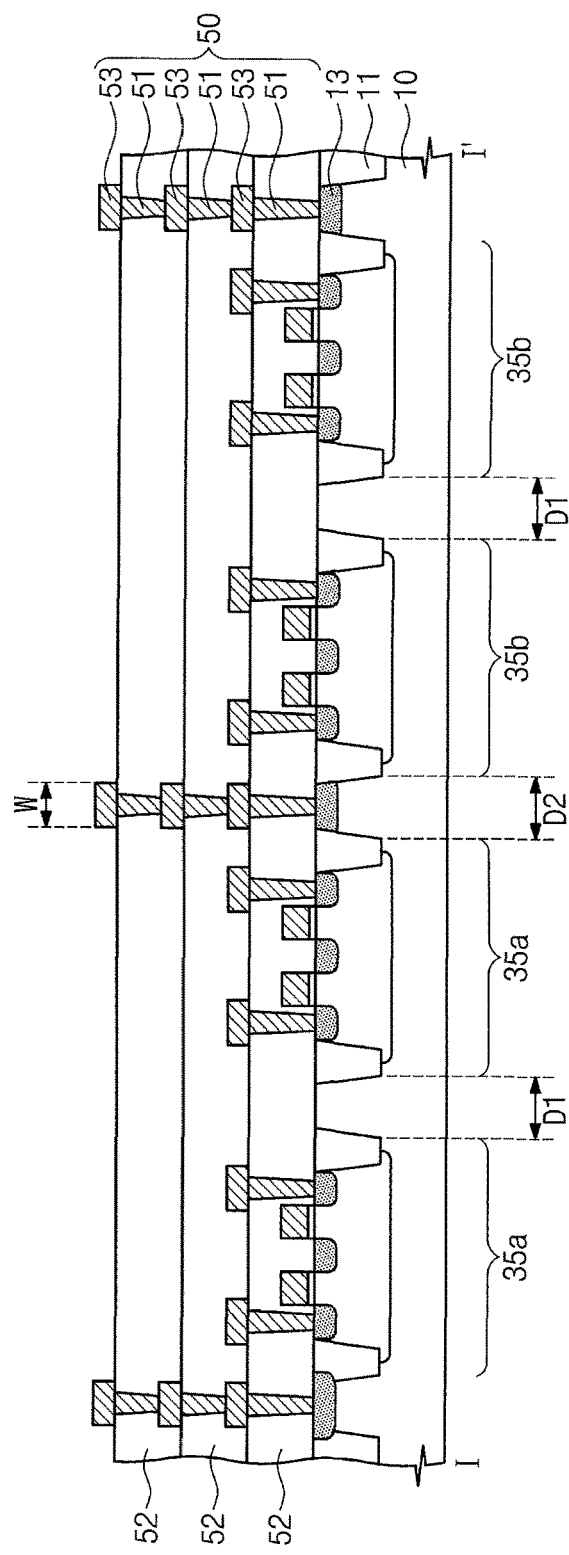
FIG. 7 is a cross-sectional view taken along line I-I' of FIG. 6.

FIG. 6 is a plan view roughly illustrating a portion of an image sensor according to some embodiments of the present inventive concepts. FIG. 7 is a cross-sectional view taken along line I-I' of FIG. 6.

Referring to FIGS. 6 and 7, a semiconductor substrate 10 may include an active pixel sensor (APS) array area R1 and an analog circuit area R2. The semiconductor substrate 10 may be a bulk silicon wafer of a first conductivity (e.g., p type), on which an epitaxial layer of the first conductivity type is formed. In certain embodiments, the bulk silicon substrate may be removed during a process of fabricating the image sensor, and in this case, the p-type epitaxial layer may be used as the semiconductor substrate 100. In certain embodiments, the semiconductor substrate 100 may include a bulk semiconductor wafer, in which a well of the first conductivity type is formed. Alternatively, the semiconductor substrate 10 may be an n-typed epitaxial layer, a bulk silicon substrate, a silicon-on-insulator (SOI) substrate, a germanium substrate, a germanium-on-insulator (GOI) substrate, a silicon-germanium substrate, or any other type of substrate.

In some embodiments, the APS array area R1 may include a plurality of pixels regions P1a, P1b, P2 and P3. For example, the APS array area R1 may include first to third pixel regions P1a, P1b, P2 and P3 that are defined by a device isolation layer. In certain embodiments, the first pixel regions P1a and P1b may be arranged spaced apart from each other along x-axis and y-axis directions. Each of the second pixel regions P2 may be disposed between the first pixel regions P1a and P1b adjacent to each other in the x-axis direction and between the first pixel regions P1a and P1b adjacent to each other in the y-axis direction. Each of the third pixel regions P3 may be disposed between the first pixel regions P1a and P1b adjacent to each other in the x-axis direction and between the first pixel regions P1a and P1b adjacent to each other in the y-axis direction. Each of the third pixel regions P3 may be positioned in a diagonal direction with respect to the second pixel regions P2.

The photoelectric conversion device PD (e.g., a photo-diode) may be may be provided in each of the first to third pixel regions P1a, P1b, P2 and P3. The photoelectric conversion device PD may be formed by ion implanting the semiconductor substrate 10 with impurities having a conductivity type opposite to that of the semiconductor substrate 10. For example, the semiconductor substrate 10 may include a p-type epitaxial layer, and the photoelectric conversion device PD may be formed by doping n-type impurities into the p-type epitaxial layer.

In the APS array area R1, a color filter and a micro lens ML may be provided to correspond to each of the pixel regions P1a, P1b, P2 and P3. For example, green color filters may be disposed on the first pixel regions P1a and P1b, red color filters may be disposed on the second pixel regions P2, and blue color filters may be disposed on the third pixel regions P3. The micro lens ML may have a convex shape so as to condense light incident onto the first to third pixel regions P1a, P1b, P2 and P3.

In some embodiments, as discussed with reference to FIG. 4, the first and second output lines OUT1 and OUT2 may extend along the y-direction and be commonly connected to the unit pixels arrayed along the y-direction. In other words, each of the first output lines OUT1 may be disposed on the first and third pixel regions P1a, P1b and P3 that are alternately arranged along the y-direction, and each of the second output lines OUT2 may be disposed on the first and second pixel regions P1a, P1b and P2 that are alternately arranged along the y-direction.

In some embodiments, first analog circuit blocks 30a and second analog circuit blocks 30b may be alternately disposed along the x-axis direction on the substrate 10 included in the analog circuit area R2.

Each of the first analog circuit blocks 30a may include a plurality of first analog circuits 35a, as discussed with reference to FIGS. 4 and 5. The first analog circuits 35a may be respectively connected to the first output lines OUT1 of the active pixel sensor array 1. For example, the first analog circuits 35a may correspond to the first CDS circuits 35a explained with reference to FIGS. 4 and 5. Alternatively, the first analog circuits 35a may correspond to the first ADC circuits 45a explained with reference to FIGS. 4 and 5. That is, each of the first analog circuits 35a may include a plurality of capacitors and a plurality of NMOS and PMOS transistors. The first analog circuits 35a may include gate electrodes, source/drain impurity doped regions, and conductive patterns formed on the semiconductor substrate 10. The first analog circuits 35a may be spaced apart from each other at a first distance D1 along the x-axis direction on the semiconductor substrate 10 included in the analog circuit region R2. The first distance D1 may correspond to a distance between shallow trench isolation (STI) regions 11 (FIG. 7) of adjacent ones of the first and second analog circuits 35a, 35b, respectively.

Each of the second analog circuit blocks 30b may include a plurality of second analog circuits 35b, as discussed with reference to FIGS. 4 and 5. The second analog circuits 35b may be respectively connected to the second output lines OUT2 of the active pixel sensor array 1. For example, the second analog circuits 35b may correspond to the second CDS circuits 35b explained with reference to FIGS. 4 and 5. Alternatively, the second analog circuits 35b may correspond to the second ADC circuits 45b explained with reference to FIGS. 4 and 5. That is, each of the second analog circuits 35b may include a plurality of capacitors and a plurality of NMOS and PMOS transistors, and may have the same configuration as that of each of the first analog circuits 35a. In some embodiments, however the second analog circuits 35b may have a different configuration from the first analog circuits 35a. The second analog circuits 35b may be arranged spaced apart from each other at the first distance D1 along the x-axis direction on the semiconductor substrate 10 included in the analog circuit region R2.

Adjacent ones of the first and second analog circuits 35a and 35b may be spaced apart from each other in the x-axis direction at a second distance D2, for example, substantially the same as the first distance D1. The distance D2 corresponds to a distance between STI regions 11 of adjacent ones of the first and second analog circuits 35a and 35b.

In some embodiments, a shielding structure 50 may be disposed between the first and second analog circuit blocks 30a and 30b that are adjacent to each other. In other words, a plurality of shielding structures 50 may be disposed each between the first and second analog circuits 35a and 35b that process first and second pixel signals generated by light with different colors. And, a plurality of first analog circuits 35a that process the first signals generated by light with the same color may be disposed between adjacent ones of the shielding structures 50. Likewise, a plurality of second analog circuits 35b that process the second signals generated by light with the same color may be disposed between adjacent ones of the shielding structures 50.

More specifically, the shielding structure 50 may extend in the y-direction (i.e., perpendicular to the x-direction). The shielding structure 50 may include an impurity doped region 13 formed in the semiconductor substrate 10, contact plugs 51 connected to the impurity doped region 13 and extending through interlayer insulating layers 52, and metal lines 53. For example, the impurity doped region 13 may be formed by doping n-type or p-type impurities into the semiconductor substrate 10. The contact plugs 51 and the metal lines 53 may include at least one of metal (e.g., tungsten, aluminum, titanium, and/or tantalum) and conductive metal nitride (e.g., titanium nitride, tantalum nitride, and/or tungsten nitride). At least the metal lines 53 of the shielding structure 50 may have a width W that is less than each of the first and second distances D1 and D2. For example, the width W of the shielding structure 50 may correspond to a width of the metal line 53. In some embodiments, the width of the impurity doped regions 13 may be greater than or less than the width of the metal lines 53. The impurity doped regions 13, contact plugs 51 and metal lines 53 may have a length in the y-axis direction that is greater than the length of the first and second analog circuits 35a and 35b in the y-axis direction, and in general that is greater than the length of the first and second analog circuit blocks 30a and 30b in the y-axis direction. Accordingly, as illustrated in FIG. 6, the shielding structure may extend completely between the first and second analog circuit blocks 30a and 30b in the y-axis direction.

In some embodiments, each of the shielding structures 50 may be disposed between the first and second analog circuit blocks 30a and 30b that process the first and second pixel signals generated by light with different colors. Thus, it may be possible to reduce electrical interference (e.g., electrical coupling) between the first and second analog circuits 35a and 35b that are adjacent to each other. Reducing coupling between the first and second analog circuits 35a and 35b may enhance performance of the analog circuits included in the image sensor.

Figure 8:
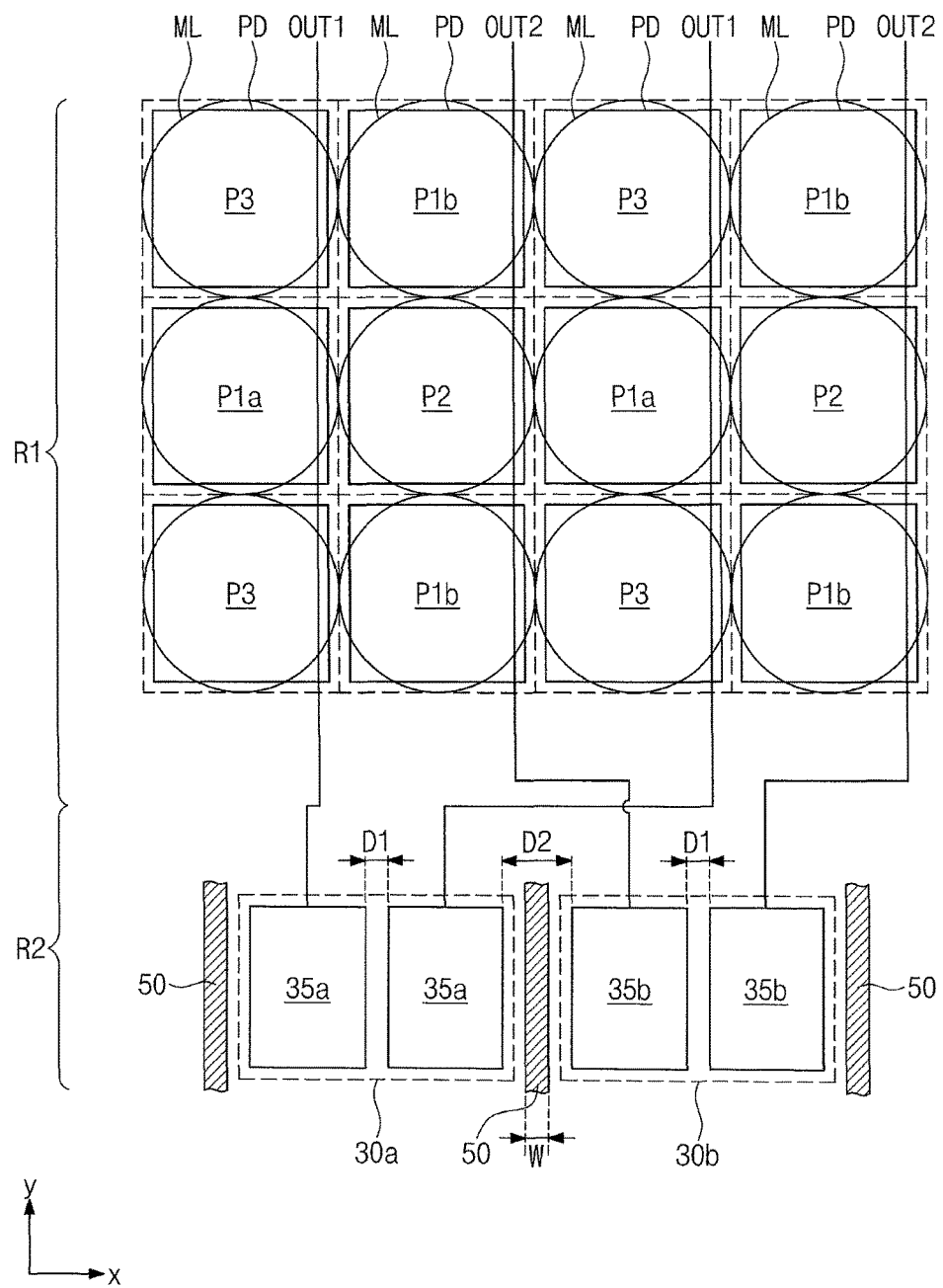
FIGS. 8, 9 and 10 are plan views illustrating image sensors according to exemplary embodiments of the present inventive concept.
Figure 9:
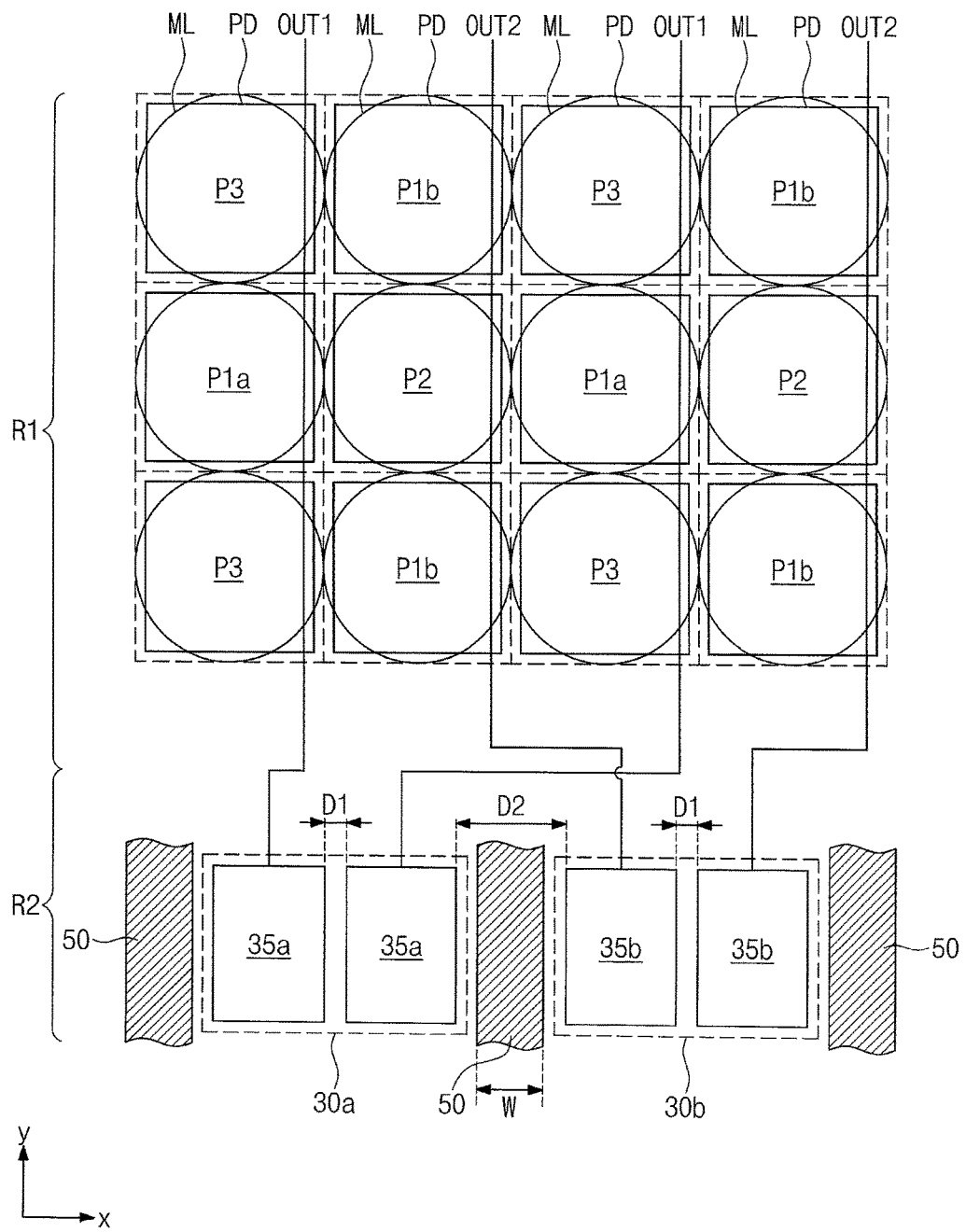
Figure 10:
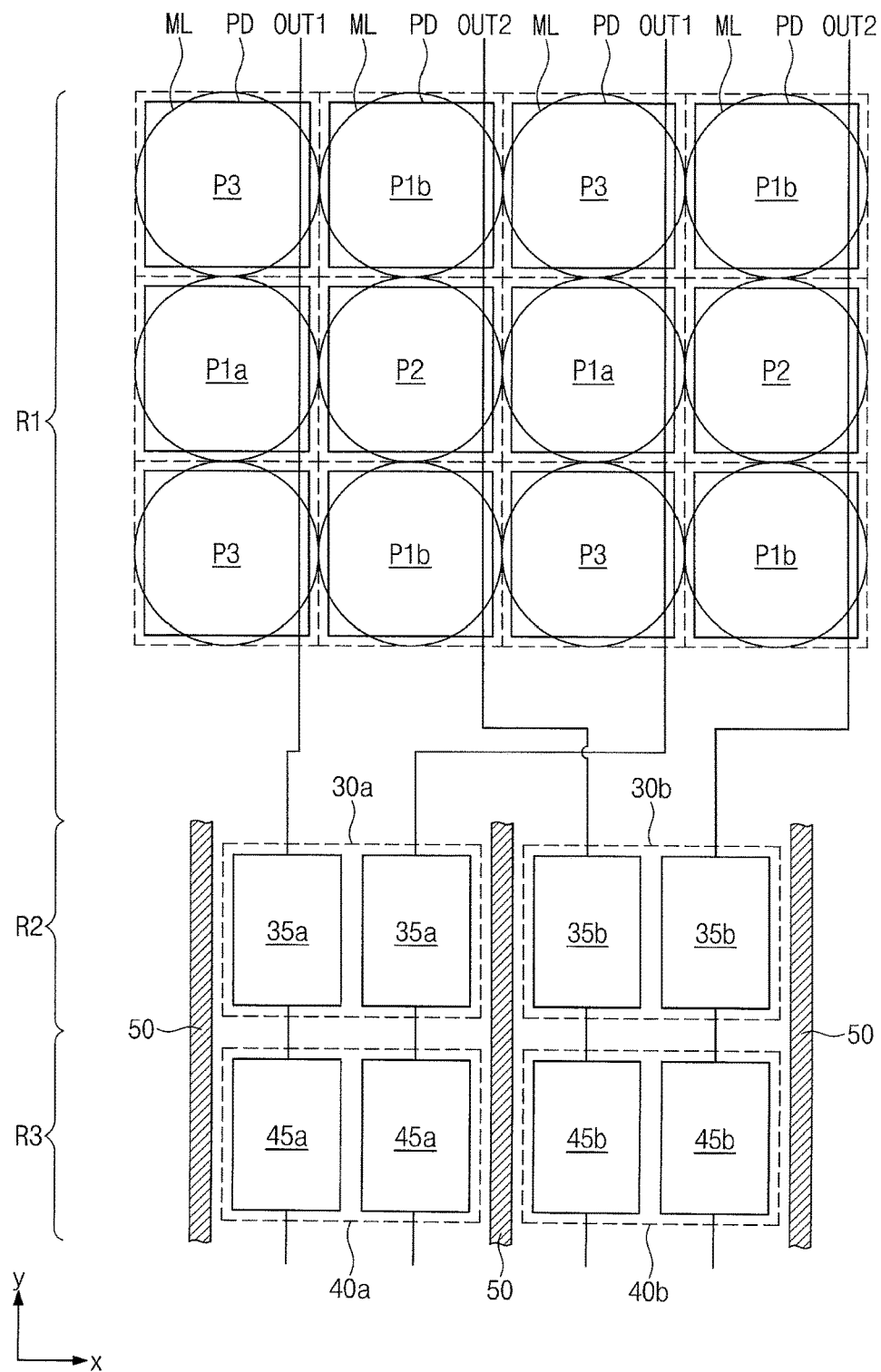

FIGS. 8, 9 and 10 are plan views roughly illustrating image sensors according to further embodiments of the present inventive concepts. In the description of the embodiments that follow, configurations and technical features that are substantially similar to those discussed with reference to FIGS. 6 and 7 may be hereinafter omitted in the interest of brevity.

Referring to FIG. 8, the first and second analog circuit blocks 30a and 30b may be alternately disposed along the x-axis direction on the semiconductor substrate 10 included in the analog circuit area R2, and a shielding structure 50 may be disposed between the first and second analog circuit blocks 30a and 30b that are adjacent to each other.

For example, the first analog circuits 35a may be disposed spaced apart from each other at a first distance D1 in each of the first analog circuit blocks 30a. Likewise, the second analog circuits 35b may be disposed spaced apart from each other at the first distance D1 in each of the second analog circuit blocks 30b. And, adjacent ones of the first and second analog circuits 35a and 35b may be spaced apart from each other at a second distance D2 that is greater than the first distance D1. Also, the shielding structure 50 may have a width W that is less than the second distance D2.

In the embodiments shown in FIG. 8, adjacent ones of the first analog circuits 35a (or adjacent ones of the second analog circuits 35b) may be spaced apart from each other at the first distance D1 that is less than the second distance D2 in each of the first and second analog circuit blocks 30a and 30b. With this configuration, it may be possible to reduce an area occupied by the first and second analog circuit blocks 30a and 30b.

Referring to FIG. 9, the first analog circuits 35a may be disposed spaced apart from each other at a first distance D1 in each of the first analog circuit blocks 30a. Likewise, the second analog circuits 35b may be disposed spaced apart from each other at the first distance D1 in each of the second analog circuit blocks 30b. And, adjacent ones of the first and second analog circuits 35a and 35b may be spaced apart from each other at a second distance D2 that is greater than the first distance D1. In this embodiment, the shielding structure 50 may have a width W that is greater than the first distance D1 and less than the second distance D2. As the shielding structure 50 has an increased width W, it may be advantageous to further reduce electrical coupling between the first and second analog circuits 35a and 35b that are adjacent to each other.

Referring to FIG. 10, the semiconductor substrate 10 may include the APS array area R1 and the analog circuit area R2 (also referred to hereinafter as a first analog circuit area), and further include a second analog circuit area R3. As discussed with reference to FIGS. 6 and 7, the APS array area R1 may include the first to third pixel regions P11a, P1b, P2 and P3, and the first analog circuit R2 may include the first and second CDS circuit blocks 30a and 30b explained with reference to FIGS. 4 and 5. The second analog circuit area R3 may include the first and second ADC circuit blocks 40a and 40b.

The first to third pixel regions P1a, P1b, P2 and P3 may be arranged in a matrix manner along the x-axis and y-axis directions in the APS array area R1.

The first and second CDS circuit blocks 30a and 30b may be alternately arranged along the x-axis direction on the semiconductor substrate 10 included in the first analog circuit area R2. Each of the first CDS circuit blocks 30a may include a plurality of first CDS circuits 35a, and each of the second CDS circuit blocks 30b may include a plurality of second CDS circuits 35b. In some embodiments, each of the first and second CDS circuits 35a and 35b may include a switch and capacitors, as explained with reference to FIG. 5. In some embodiments, the first CDS circuits 35a may be respectively connected to the first output lines OUT1 of the active pixel sensor array 1, and the second CDS circuits 35b may be respectively connected to the second output lines OUT2 of the active pixel sensor array 1.

The first and second ADC circuit blocks 40a and 40b may be alternately arranged along the x-axis direction on the semiconductor substrate 10 included in the second analog circuit area R3. Each of the first ADC circuit blocks 40a may include a plurality of first ADC circuits 45a, and each of the second ADC circuit blocks 40b may include a plurality of second ADC circuits 45b. In some embodiments, each of the first and second ADC circuits 45a and 45b may include a comparator, as discussed with reference to FIG. 5. In some embodiments, the first ADC circuits 45a may be respectively connected to the first CDS circuits 35a, and the second ADC circuits 45b may be respectively connected to the second CDS circuits 35b.

As illustrated in FIG. 10, the shielding structure 50 may extend along the y-axis direction from between adjacent ones of the first and second CDS circuits 35a and 35b toward and between adjacent ones of the first and second ADC circuits 45a and 45b. In other words, the plurality of first CDS circuits 35a and the plurality of first ADC circuits 45a may be disposed between adjacent ones of the shielding structures 50. And, the plurality of second CDS circuits 35b and the plurality of second ADC circuits 45b may be disposed between adjacent ones of the shielding structures 50.

Figure 11:
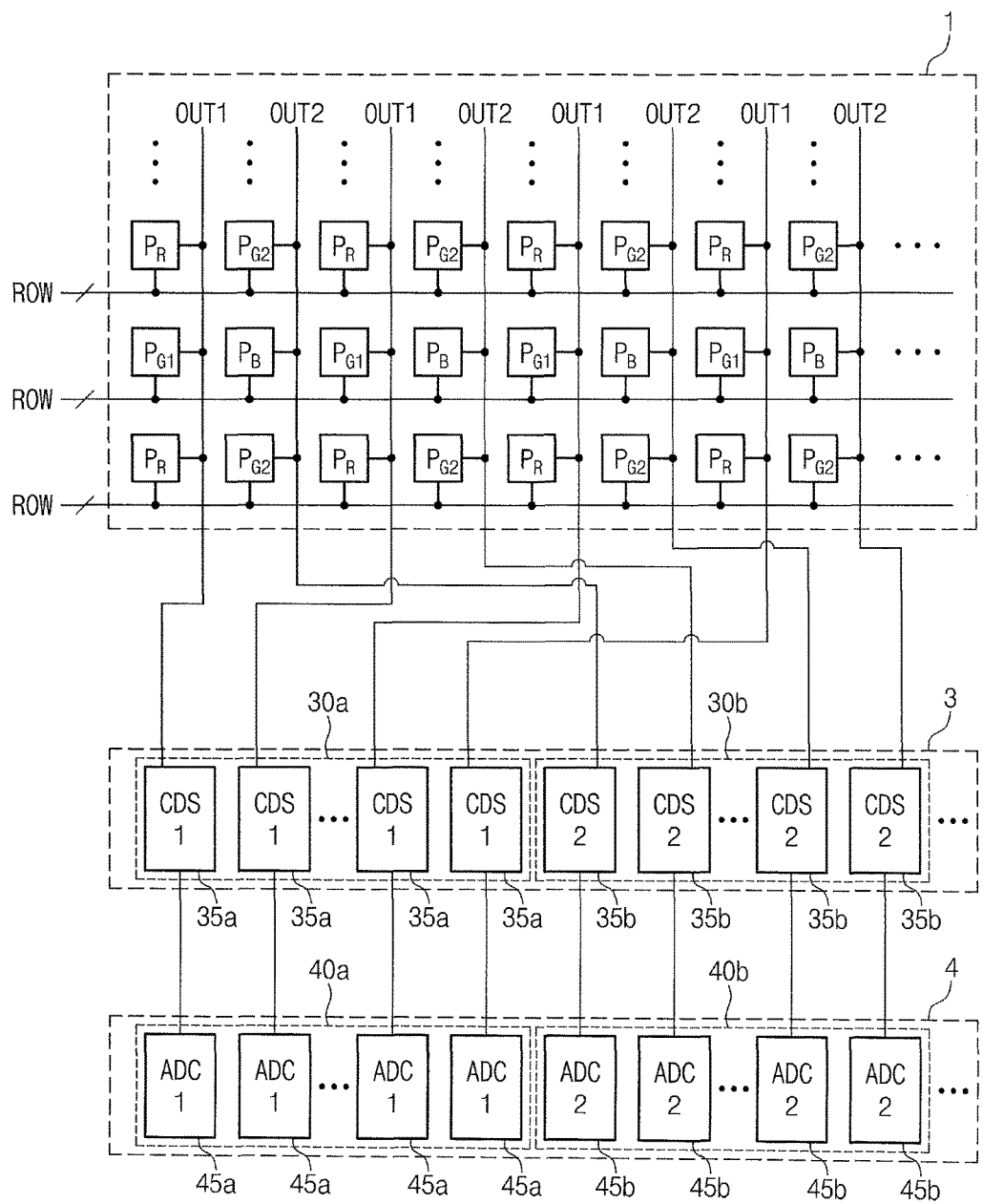
FIG. 11 is a block diagram illustrating an image sensor according to exemplary embodiments of the present inventive concept.

FIG. 11 is a block diagram illustrating an image sensor according to exemplary some of the present inventive concepts. In the description that follows, configurations and technical features that are substantially similar to those discussed with reference to FIG. 4 may be hereinafter omitted in the interest of brevity.

Referring to FIG. 11, the active pixel sensor array 1 may include unit pixels $P_R$, $P_B$, $P_{G1}$ and $P_{G2}$ arranged in the Bayer pattern, and the first and second output lines OUT1 and OUT2 alternately arranged along a single direction.

The correlated double sampler 3 may include the first and second CDS circuit blocks 30a and 30b alternately disposed along one direction. Each of the first CDS circuit blocks 30a may include a plurality of first CDS circuits 35a connected to the first output lines OUT1, and each of the second CDS circuit blocks 30b may include a plurality of second CDS circuits 35b connected to the second output lines OUT2.

In some embodiments, each of the first CDS circuit blocks 30a may be connected to a predetermined number of the first output lines OUT1 of the active pixel sensor array 1. Likewise, each of the second CDS circuit blocks 30b may be connected to the predetermined number of the second output lines OUT2 of the active pixel sensor array 1. Each of the first CDS circuit blocks 30a may include the predetermined number of first CDS circuits 35a, and each of the second CDS circuit blocks 30b may include the predetermined number of second CDS circuits 35b. In other words, the number of the first CDS circuits 35a may be the same as that of the first output lines OUT1, and the number of the second CDS circuits 35b may be the same as that of the second output lines OUT2.

The analog-to-digital converter 4, likewise to the correlated double sampler 3, may include the first and second ADC circuit blocks 40a and 40b alternately arranged along one direction. Each of the first ADC circuit blocks 40a may include the predetermined number of first ADC circuits 45a, and each of the second ADC circuit blocks 40b may include the predetermined number of second ADC circuits 45b.

Figure 12:
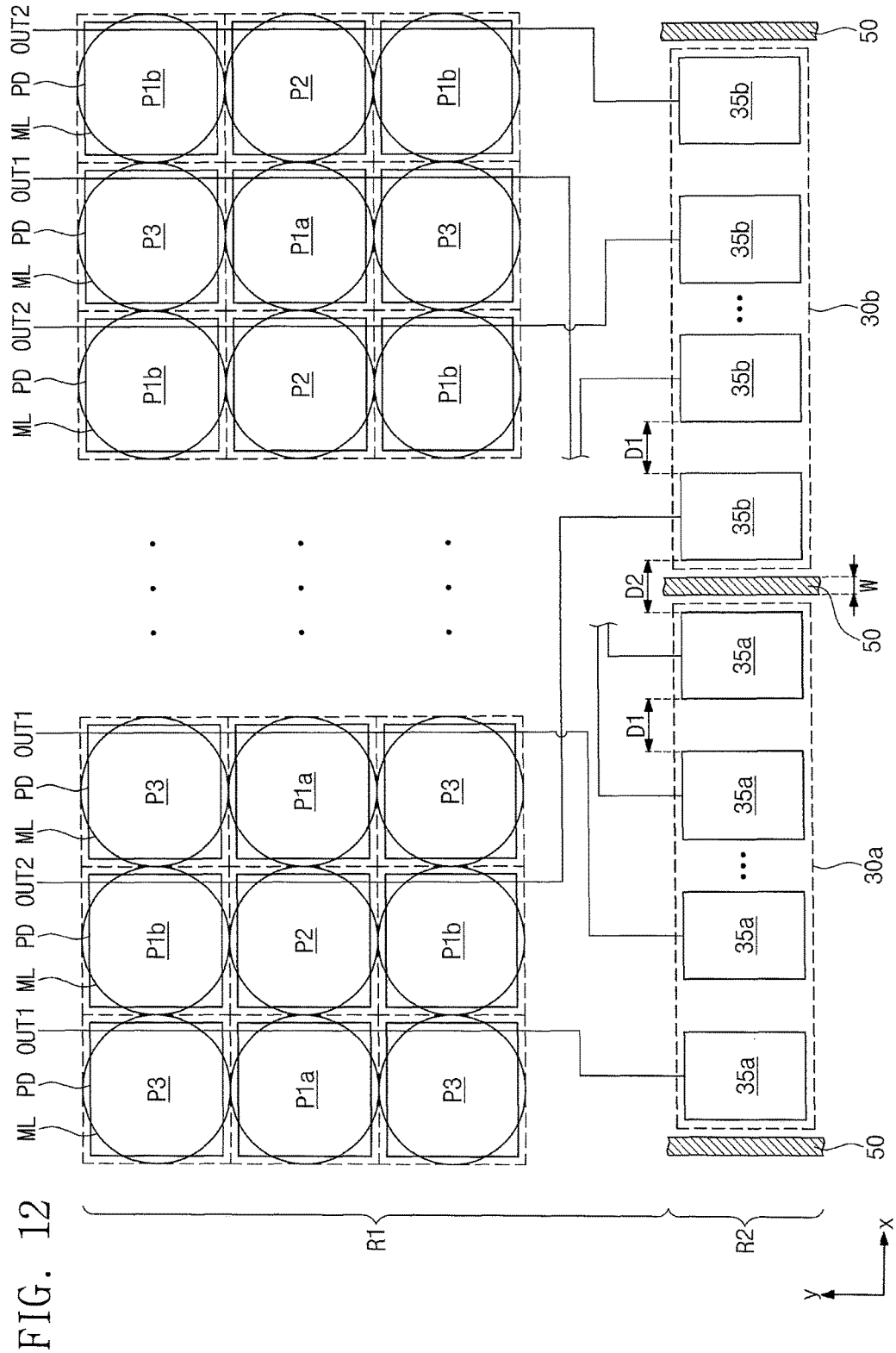
FIGS. 12, 13 and 14 are plan views illustrating image sensors according to exemplary embodiments of the present inventive concept.
Figure 13:
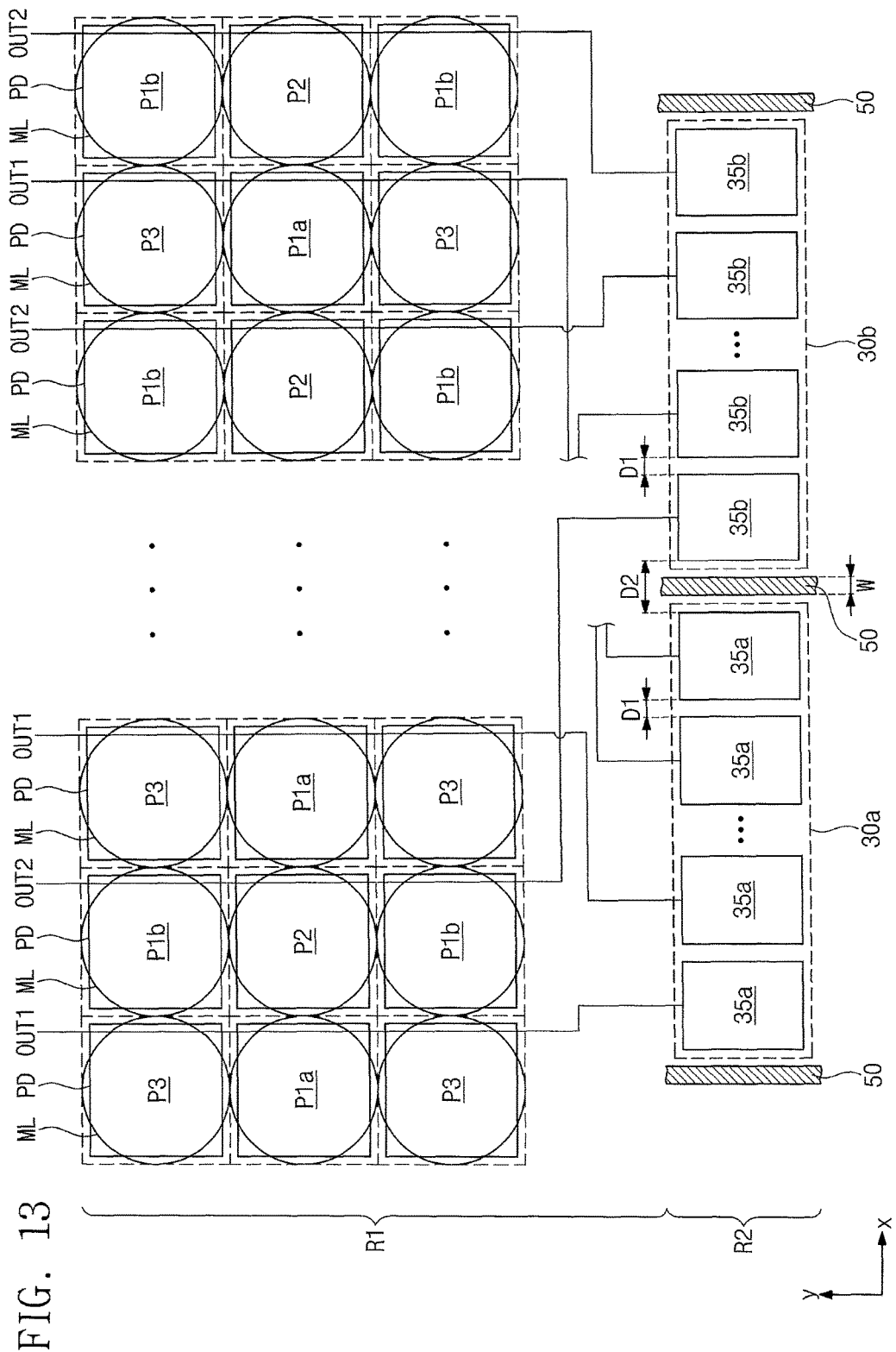
Figure 14:
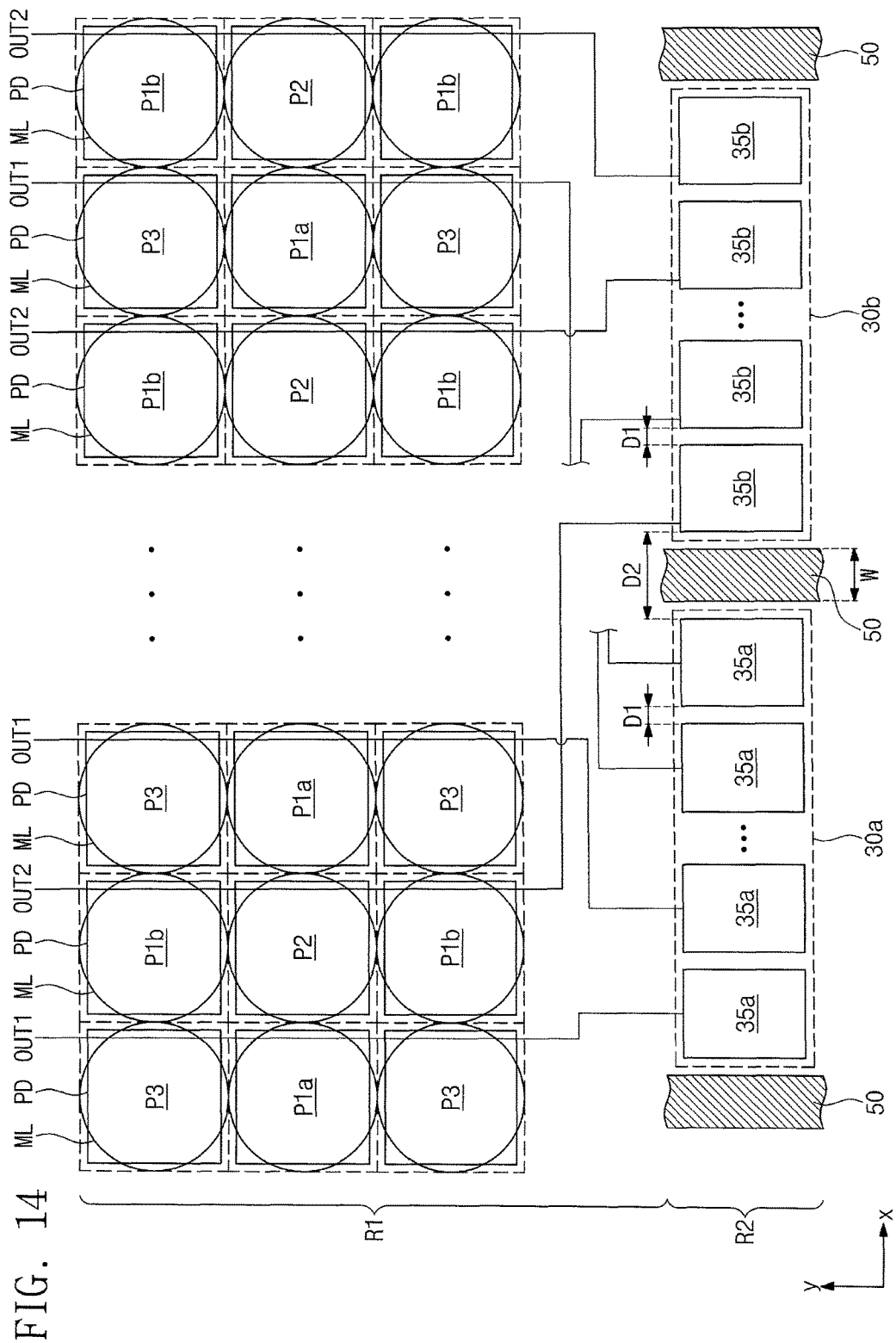

FIGS. 12, 13 and 14 are plan views roughly illustrating image sensors according to further embodiments of the present inventive concepts. In the description of the embodiments that follow, configurations and technical features that are similar to those discussed with reference to FIGS. 6 and 7 may be hereinafter omitted in the interest of brevity.

Referring to FIG. 12, the semiconductor substrate 10 may include the APS array area R1 and the analog circuit area R2.

The APS array area R1 may include a plurality of first to third pixel regions $P_R$, $P_B$, $P_{G1}$ and $P_{G2}$ arranged in a matrix manner along the x-axis and y-axis directions crossing each other. The APS array area R1 may include the first and second output lines OUT1 and OUT2 alternately disposed along the x-axis direction.

In some embodiments, the first and second analog circuit blocks 30a and 30b may be disposed on the semiconductor substrate 10 included in the analog circuit area R2, and be alternately arranged along the x-axis direction.

Each of the first analog circuit blocks 30a may include the predetermined number of first analog circuits 35a, and the first analog circuits 35a may be disposed spaced apart from each other at a first distance D1 along the x-axis direction. The predetermined number of first analog circuits 35a may be greater than two. Each of the second analog circuit blocks 30b may include the predetermined number of second analog circuits 35b, and the second analog circuits 35b may be disposed spaced apart from each other at the first distance D1 along the x-axis direction. The predetermined number of second analog circuits 35b may be greater than two. In some embodiments, as formerly stated, the first analog circuits 35a may correspond to the first CDS circuits 35a or the first ADC circuits 45a described with reference to FIGS. 4 and 5. The second analog circuits 35b may correspond to the second CDS circuits 35b or the second ADC circuits 45b described with reference to FIGS. 4 and 5.

The first and second analog circuits 35a and 35b may be disposed adjacent to each other and may be spaced apart from each other at a second distance D2 in the x-axis direction. The second distance D2 between the first and second analog circuits 35a and 35b may be substantially the same as or similar to the first distance D1, as shown in FIG. 12. Alternatively, as shown in FIGS. 13 and 14, the second distance D2 between the first and second analog circuits 35a and 35b may be greater than the first distance D1.

The shielding structure 50 may be disposed between adjacent ones of the first and second CDS circuit blocks 30a and 30b. The shielding structure 50 may extend in the y-axis direction perpendicular to the x-axis direction, and have a width W that is less than the second distance D2. Alternatively, as shown in FIG. 14, the shielding structure 50 may have a width W that is less than the second distance D2 and greater than the first distance D1. Moreover, as formerly stated, the shielding structure 50 may include the impurity doped region 13 in the semiconductor substrate 10, the contact plugs 51 connected to the impurity doped region 13, and the metal lines 53.

According to some embodiments, since the shielding structures are disposed between the first and second analog circuit blocks that process first and second pixel signals generated by light with different colors, it may be possible to reduce electrical interference (e.g., electrical coupling) between adjacent first and second analog circuits, which may enhance performance of the analog circuits included in the image sensor.

In addition, the analog circuits that process first pixel signals (or second pixel signals) generated by light with the same color may be spaced apart from each other between a pair of shielding structures. In other words, no shielding structure may be disposed between the analog circuits that process the first pixel signals (or the second pixel signals). This arrangement may allow the image sensor to have increased integration.

Figure 15:
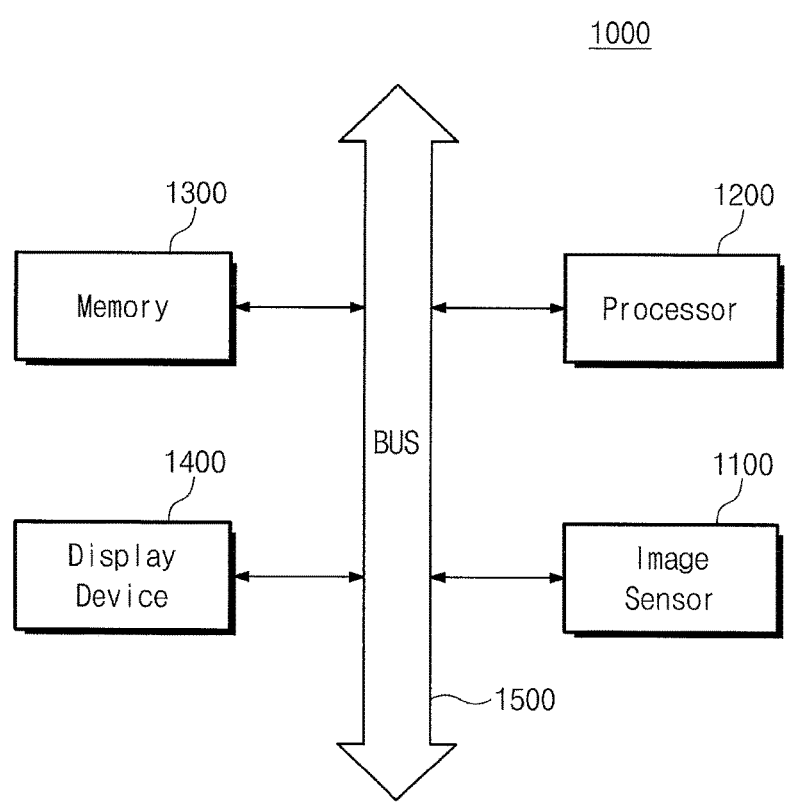
FIG. 15 is a block diagram of a device including an image sensor in some embodiments according to the inventive step.

FIG. 15 is a block diagram of a device including an image sensor in some embodiments according to the inventive concept. According to FIG. 15, an image sensor 1100 can be operatively coupled to a processor 1200, a memory 1300, and a display device 140 by a bus 1500 in some embodiments according to the inventive concept Although the present inventive concepts have been described in connection with the embodiments illustrated in the accompanying drawings, is the inventive concepts are not limited thereto. It will be apparent to those skilled in the art that various substitution, modifications and changes may be thereto without departing from the scope and spirit of the inventive concepts.

What is claimed is:

1. An image sensor comprising:
   first pixels and second pixels arranged in alternating order along a first direction;
   first output lines connected to respective ones of the first pixels;
   second output lines connected to respective ones of the second pixels;
   first analog circuit blocks and second analog circuit blocks arranged in an alternating order along the first direction, wherein each of the first analog circuit blocks includes a plurality of first analog circuits, each of the first analog circuits connected to a respective one of the first output lines, and each of the second analog circuit blocks includes a plurality of second analog circuits, each of the second analog circuits connected to a respective one of the second output lines; and
   shielding structures disposed between adjacent ones of the first and second analog circuit blocks,
   wherein each of the first and second analog circuit blocks is disposed between adjacent ones of the shielding structures.

2. The image sensor of claim 1, wherein the plurality of first analog circuits within ones of the first analog circuit blocks are spaced apart from each other at a first distance in the first direction, and
   wherein outermost ones of the plurality of first analog circuits within ones of the first analog circuit blocks are spaced apart from adjacent outermost ones of the plurality of second analog circuits within adjacent ones of the second analog circuit blocks at a second distance in the first direction, the second distance being substantially equal to the first distance.

3. The image sensor of claim 2, wherein the shielding structures have a width less than the second distance.

4. The image sensor of claim 1, wherein the plurality of first analog circuits within ones of the first analog circuit blocks are spaced apart from each other at a first distance in the first direction, and
   wherein outermost ones of the plurality of first analog circuits within ones of the first analog circuit blocks are spaced apart from adjacent outermost ones of the plurality of second analog circuits within adjacent ones of the second analog circuit blocks at a second distance in the first direction, the second distance being greater than the first distance.

5. The image sensor of claim 4, wherein the shielding structures have a width greater than the first distance and less than the second distance.

6. The image sensor of claim 1, wherein the image sensor further comprises a substrate, each of the first and second analog circuits includes a MOS transistor in the substrate, and each of the shielding structures comprises a doped region in the substrate.

7. The image sensor of claim 6, wherein the image sensor further comprises an interlayer insulating layer on the substrate, and wherein each of the shielding structures further comprises a contact plug extending through the interlayer insulating layer and a metal line on the contact plug.

8. The image sensor of claim 7, wherein the metal line and the contact plug have lengths, in a second direction that is perpendicular to the first direction, that are greater than lengths of the first and second analog circuit blocks in the second direction.

9. An image sensor comprising:
   an active pixel sensor array including unit pixels arranged in a matrix and a plurality of first and second output lines connected to the unit pixels, the first and second output lines being arranged in alternating order along a first direction; and
   an analog-to-digital converter that converts pixel signals to digital signals, the pixel signals being output from the first and second output lines of the active pixel sensor array, wherein the analog-to-digital converter comprises:
a plurality of shielding structures spaced apart from each other along the first direction; and
a plurality of first analog circuits respectively connected to the first output lines; and
a plurality of second analog circuits respectively connected to the second output lines,
wherein the plurality of first analog circuits are disposed between first adjacent ones of the shielding structures, and
the plurality of second analog circuits are disposed between second adjacent ones of the shielding structures.

10. The image sensor of claim 9, wherein each of the shielding structures is disposed between a respective one of the first analog circuits and a respective one of the second analog circuits that are adjacent to each other.

11. The image sensor of claim 9, wherein the unit pixels comprise first pixels and second pixels arranged in alternating order along the first direction,
wherein the first output lines extend in a second direction perpendicular to the first direction and are respectively connected to the first pixels, and the second output lines extend in the second direction and are connected to respective ones of the second pixels.

12. The image sensor of claim 9, wherein adjacent ones of the first analog circuits are spaced apart from each other by a first distance,
wherein adjacent ones of the first and second analog circuits are spaced apart from each other by a second distance that is substantially equal to the first distance.

13. The image sensor of claim 9, wherein adjacent ones of the first analog circuits are spaced apart from each other by a first distance, and
wherein adjacent ones of the first and second analog circuits are spaced apart from each other by a second distance that is greater than the first distance.

14. The image sensor of claim 9, wherein adjacent ones of the first analog circuits are spaced apart from each other by a first distance,
wherein adjacent ones of the first and second analog circuits are spaced apart from each other by a second distance that is greater than the first distance, and
wherein the shielding structures have a width that is greater than the first distance and less the second distance.

15. The image sensor of claim 9, wherein each of the first and second analog circuits includes at least one capacitor.

16. The image sensor of claim 9, wherein each of the first and second analog circuits includes a comparator.

17. An image sensor, comprising:
first pixels configured to detect light having a first color;
second pixels configured to detect light having a second color;
first correlated double sampler (CDS) circuit blocks coupled to the first pixels and second CDS circuit blocks coupled to the second pixels, wherein each of the first CDS circuit blocks includes a plurality of first analog circuits respectively connected to ones of the first pixels and each of the second CDS circuit blocks includes a plurality of second analog circuits respectively connected to ones of the second pixels; and
a plurality of shielding structures respectively between adjacent ones of the first and second analog circuits.

18. The image sensor of claim 17, wherein adjacent ones of the first analog circuits are spaced apart from each other by a first distance in a first direction, and
wherein adjacent ones of the first and second CDS circuit blocks are spaced apart from each other by a second distance in the first direction, wherein the second distance is greater than the first distance.

19. The image sensor of claim 17, wherein the image sensor further comprises a substrate, each of the first and second analog circuits is on the substrate, and ones of the shielding structures comprise respective doped regions in the substrate.

20. The image sensor of claim 19, wherein the image sensor further comprises an interlayer insulating layer on the substrate, and wherein ones of the shielding structures further comprise a respective contact plug extending through the interlayer insulating layer and a respective metal line on the contact plug.

* * * * *